Aug. 28, 1951 C. D. ELLIS 2,566,176
ANIMAL TRAP
Filed Dec. 27, 1948
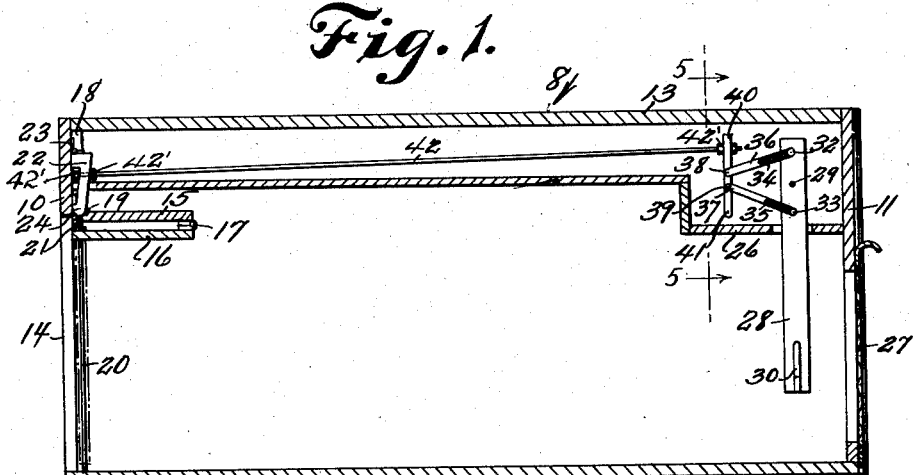
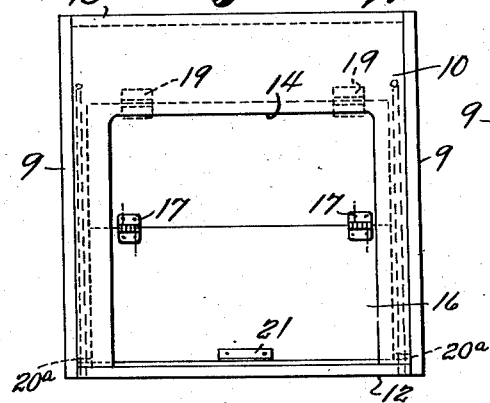
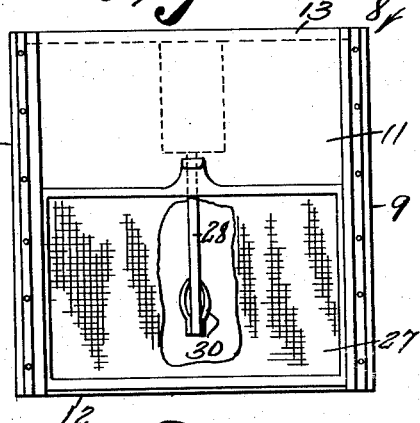
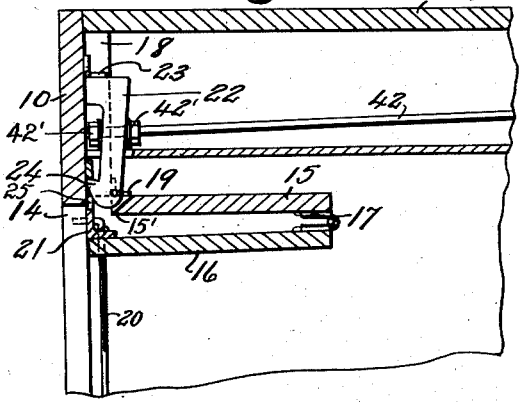
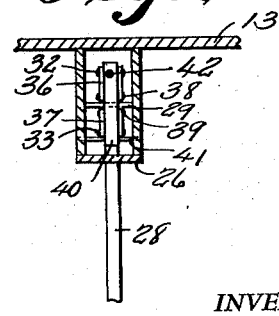
INVENTOR.
Charles D. Ellis
BY Victor J. Evans & Co.
ATTORNEYS Patented Aug. 28, 1951

2,566,176

UNITED STATES PATENT OFFICE 2,566,176

ANIMAL TRAP

Charles D. Ellis, San Mateo, Calif.

Application December 27, 1948, Serial No. 67,258

7 Claims. (Cl. 43—61)

The present invention relates generally to improvements in animal traps and has particular reference to improvements in that class of traps particularly designed to trap fur bearing or like valuable animals in the living state, and is a continuation in part of my abandoned application for Animal Traps filed January 29, 1946, Serial No. 644,049.

The principal object is to provide in the trap, mechanism, whereby the opening of the door sets the trap.

A further object of the invention is the provision of an animal trap of simple design that embodies a positive quick acting closure adapted to entrap the animal within the enclosure of the trap at the slightest interference with the bait carried by the closure tripping mechanism thereof.

A further object of the invention is to provide an animal trap employing a quick acting closure and combined closure tripping mechanism that is of extremely sensitive character and that may be easily sprung by a very small animal.

A still further object of the invention is to provide an animal trap which employs a very simple yet positive closure tripping mechanism remotely arranged from the closure and in such a position that the animal entering the trap enclosure to secure the bait must pass under and beyond said closure to insure his entrapment when the closure is sprung.

Other objects and advantages will be apparent during the course of the following description.

In the accompanying drawings forming a part of this specification and in which like numerals are employed to designate like parts throughout the same.

Figure 1 is a longitudinal sectional view of the trap showing the spring actuated closure tripping mechanism and bait holder in cocked position and the connection between the tripping mechanism and the closure.

Figure 2 is an end view of the trap showing the closure end thereof with the closure in sprung position.

Figure 3 is an end view of the opposite end of the trap showing the sliding door and partly broken away to show the location of the tripping mechanism in the enclosure.

Figure 4 is an enlarged sectional detail of the hinged closure and the trigger means for holding the same in cocked position in which position it is shown and Figure 5 is an enlarged sectional view of the tripping mechanism on the line 5—5 of Fig. 1.

Referring to the drawing in detail the trap enclosure is constituted of a suitable elongated box-like casing 8 embodying sides 9, ends 10 and 11, bottom 12 and top 13. The end 10 is provided with an entrance opening 14 and a spring actuated closure comprising hinged sections 15 and 16 hingedly connected together by means of spring hinges 17, Figures 2 and 4, said hinges tending to normally force the closure to closed position. The closure as thus formed being in turn hinged to the inner side of the end 10 and above the opening 14 by means of hinges 19.

As disclosed in Figures 1 and 4 it will be observed that the closure is shown in cocked position which is manually accomplished by grasping the under edge of the section 16 and raising this section. The section 16 has pintles 20a at the lower opposite ends thereof which slide along the guide rods 20 until the bottom edge of the section is approximately flush with the upper end of the entrance opening 14.

The mechanism for retaining the closure in cocked position consists of a slotted angle bracket 21 positioned at the lower edge of section 16 of the closure, which bracket, when the section 16 is elevated, assumes the position shown in Figures 1 and 4. A trigger 22 is pivotally mounted on the inner face of the end 10 of the casing by means of a hinge 23 and is provided at its lower end with a barb 24, which barb is angularly disposed in such a manner that the slotted bracket 21 passes under the barb and said barb then snaps into the slot 25 in said bracket and retains the closure in cocked position until tripped by the tripping mechanism. Clearance of the barb 24 of the trigger 22 with relation to the section 15 is achieved by the notch 15' in the upper edge of the section 15.

The closure tripping mechanism comprises a casing 26 secured to the end 11 of the casing above the end door 27. This mechanism embodies a pivoted tripping lever 28 pivotedly mounted on the pivot 29 and having a bait holder 30 mounted at its lower end. The upper end of this lever carries the pivots 32 and 33 which are received in the elongated slots 34 and 35 in one end of the pairs of links 36 and 37 respectively. The links 36 and 37 being loosely pivoted at their opposite ends on the pivots 38 and 39 carried by the tripper arm 40 pivoted in the casing 8 on the pivot 41. The tripper arm 40 is connected to the trigger 22 by means of a rod 42 which in turn is retained in the trigger 22 and arm 40 by lock nuts 42'.

The operation is as follows:

Referring to Figures 1 and 4 in which the closure and tripping mechanism are shown cocked for use and assuming that an animal has entered the trap to consume the bait 30, immediately that the animal touches the bait the tripping arm is necessarily rocked slightly in either a forwardly or rearwardly direction upon its pivot point 29 due to the action of the slots 34 and 35 in the levers 36 and 37 on their respective pivot points 32 and 33 which slight movement causes one of the links 36 and 37 to pivot the tripper arm 40. This slight movement of the arm imparts a jerk to the rod 42 and releases the trigger 22 from the bracket opening 25 whereupon the closure is instantly sprung shut by means of its spring hinges 17, the lower section 16 of said closure being guided to closed position by the guide rods 20. It is obvious that the closing action of the closure causes the rod 42 to be drawn forwardly and this action automatically resets the tripping lever through the jerk imparted to the elements 28, 36, 37, and 40. The closure, of course, has to be manually reset as hereinbefore described. In other words if the lever 28 is pushed rearwardly by the animal attacking the bait, the resetting of the lever is caused by the jerk of the elements 28, 36, 37 and 40 because such jerk will act on the lever 28 causing it to drop to its original vertical position by gravity. The action is necessary should the lever tend to stay in the position where it was pushed by the animal attacking the bait.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A device of the class described, comprising an enclosure having an entrance opening in one end thereof, a hinged door adapted to close said opening, said door having a spring urged section, means for retaining said door in retracted position adjacent said opening, and tripping means associated therewith to cause said door to be moved from said retracted position, said tripping means comprising a rod attached to the means for retaining the door in retracted position, an arm fixed to the inner end of said rod, a pivoted lever and loosely coupled links connecting said arm and said lever.

2. A device of the class described, in combination, an enclosure having an entrance opening in one end thereof, a door therefor hingedly positioned above said opening, said door embodying hinged sections having spring means for normally urging the sections to closed position, means for retaining said sections in retracted position, and tripping means for releasing said sections to cause the same to close said opening, said tripping means comprising a rod attached to the means for retaining the door in retracted position, an arm fixed to the inner end of said rod, a pivoted lever and loosely coupled links connecting said arm and said lever.

3. A device of the class described, in combination, an enclosure forming a trap and having an entrance opening in one end thereof, a hinged door for said opening embodying a spring, urged hinged section, means for retaining said door in retracted position, remotely positioned means for tripping said retaining means and a connection connecting said tripping means and said retaining means and the means for tripping said retaining means comprises an arm fixed to said connection, a pivoted lever and links loosely coupled to said arm and said links.

4. In an animal trap of the class described, in combination, an enclosure having an entrance opening in one end thereof, a hinged door for said entrance opening embodying a spring urged hinged section, and said door is adapted to be retracted above said opening against the urge of said section means for retaining said closure in retracted position, and remotely positioned means for tripping said door sections, whereby the closing action of said door causes said tripping means to be recocked by gravity for subsequent tripping operations, said tripping means comprising a rod attached to the means for retaining the door in retracted position, an arm fixed to the inner end of said rod, a pivoted lever and loosely coupled links connecting said arm and said lever.

5. A device of the character described, comprising an enclosure forming a trap and having an entrance opening in one end thereof, a hinged door for said entrance opening embodying a section hinged to the enclosure above the entrance opening, a second section hinged to the first section and normally spring held in an open position, a latch engaging the free end of the second section for holding it in folded position beneath the first section against the tension of the spring, and means in the enclosure for tripping said latch, said means comprising a rod connected to said latch, an arm fixed to the inner end of said rod, a pivoted lever and links loosely coupling said arm to said lever.

6. A device of the character described, comprising an enclosure forming a trap and having an entrance opening in one end thereof, a hinged door for said entrance opening embodying a section hinged to the enclosure above the entrance opening, a second section hinged to the first section and a spring normally holding said second section in an open position, a latch for engaging the free end of the second section for holding it in folded position beneath the first section against the tension of the spring, a bait carrying arm pivoted within said enclosure, and means connected to said arm for tripping the latch by the movement thereof in either direction, said means comprising a rod connected to said latch, a second arm on the inner end of said rod and links loosely coupling said second arm to said bait arm.

7. A device of the character described, comprising an enclosure forming a trap and having an entrance opening at one end thereof, a spring hinged door for said entrance opening embodying a section hinged to the enclosure above the entrance opening, a second section spring hinged to the first section and having its free end extending beyond the hinged end of the first mentioned section and normally spring held in an open position, a latch for engaging the free end of the second section for holding it in its folded position beneath the first section, against the spring tension of the hinges, a pivoted bait carrying arm in said enclosure and means connected to said arm for tripping the latch by the movement thereof in either direction, said means comprising a rod connected to said latch, an arm connected to the inner end of the rod and links loosely coupling said arm to said bait carrying arm.

CHARLES D. ELLIS.

REFERENCES CITED

The following references are of record in the file of this patent:

UNITED STATES PATENTS

| Number | Name | Date |
|---|---|---|
| 1,222,406 | Jakab | Apr. 10, 1917 |
| 1,413,894 | Bosel | Apr. 25, 1922 |
| 1,866,776 | Sloulin | July 12, 1932 |
| 2,066,733 | Lee | Jan. 5, 1937 |